July 14, 1925.

G. B. SAYRE

HYDROCARBON MOTOR

Filed May 1, 1920

1,545,928

Inventor,
Gordon B. Sayre,
By William Sibbitts
Atty.

Patented July 14, 1925.

1,545,928

UNITED STATES PATENT OFFICE.

GORDON B. SAYRE, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed May 1, 1920. Serial No. 378,115.

*To all whom it may concern:*

Be it known that I, GORDON B. SAYRE, a citizen of the United States, and resident of Detroit, Wayne County, State of Michigan, have invented certain new and useful Improvements in Hydrocarbon Motors, of which the following is a specification.

This invention relates to hydrocarbon motors and more particularly to the lubrication of such motors.

As is well known the lubrication requirements of a hydrocarbon motor vary with the load. For instance, a heavily loaded motor requires more lubrication than a motor running under a light load and it will be evident, therefore, that the lubrication system, if properly designed to lubricate a motor under heavy loads will over lubricate a motor when the latter is operating under a light load. When the motor is running light the throttle is usually closed, or partially closed, creating a considerable depression in the motor cylinders on the intake stroke, and this depression causes a portion of the excess supply of oil to leak past the piston and into the combustion space. The oil is then burned, causing carbon in the cylinder and also smoke in the exhaust.

The present invention has for its object, therefore, to overcome the condition above outlined and to regulate the oil pressure in the lubrication system of a hydrocarbon motor in such a manner that the pressure will be decreased when the load is decreased.

Another object of the invention is to provide a relief valve unit for hydrocarbon motors so constructed that the normal excess of oil necessary for the proper lubrication of a motor and to maintain the required oil pressure may be returned to the oil pump and also constructed in such a manner that the oil pressure is automatically decreased when the load is decreased and the motor is throttled down.

Another object of the invention is to provide a unitary valve structure having means for releasing oil when the maximum oil pressure is obtained and also having means coacting with the first mentioned releasing means to release a greater amount of oil when the load on the motor is decreased.

Another object of the invention is to provide a relief valve unit having yielding means for maintaining the lubricant and lubricating system at a maximum pressure and further means responsive to the pressure in the mixture intake manifold of the motor for regulating the tension on the first mentioned means.

Other objects of the invention will appear as the description proceeds.

Figure 1:
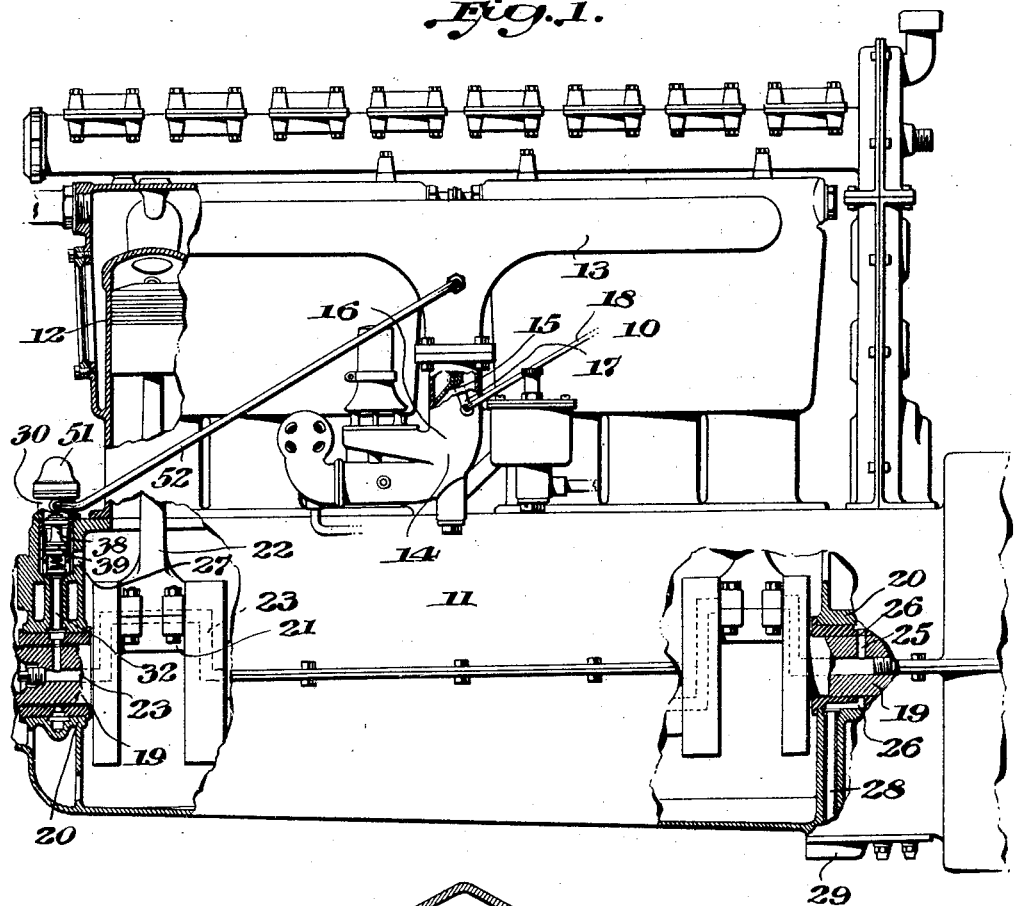
Figure 2:
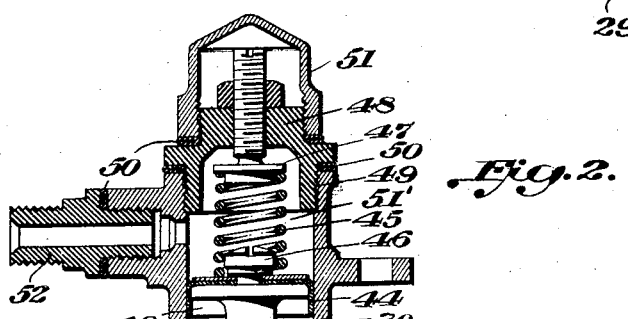

One embodiment of the invention has been illustrated in the accompanying drawings, in which:

Figure 1 is an elevational view showing a portion of a hydrocarbon motor and illustrating partly in section the lubrication system of a motor and the oil pressure relief valve, and Figure 2 is an enlarged sectional view illustrating the details of the construction of the oil pressure relief valve.

The motor 10 in connection with which the oil pressure relief valve has been illustrated is supported on the crank case 11, the cylinders of the motor being indicated at 12. An intake manifold 13 is connected to the motor and is supplied with a suitable mixture of air and gas from the carburetor 14. Any suitable form of throttle valve 15 is arranged in the mixing chamber 16 of the carburetor for controlling the supply of mixture, the throttle valve being controlled by an arm 17 and a rod 18.

As above stated, it will be understood that with the motor running slowly or idling and the throttle valve nearly closed there is a depression in the intake manifold 13, but when the throttle valve 15 is opened to increase the speed of the motor the depression is overcome by atmospheric pressure, due to the fact that the intake manifold is then open to the atmosphere through the carburetor.

Within the crank case 11 is a crank shaft 19 mounted in suitable bearings 20, each of the cranks 21 having a connecting rod 22 journaled thereon and connected to a piston sliding in one of the cylinders 12. The crank shaft 19 as shown is drilled to form an oil conduit 23 and from this conduit oil is fed to the upper ends of the connecting rods 22 through suitable channels formed therein. Oil is fed to the channels 23 in the crank shaft through suitable channels 25 in the shaft and channel 26 in one of the bearings, the latter channel being connected with a pipe 28, the latter pipe being fed from a pump 29, preferably located in the bottom of the crank case and driven from the motor. It will be understood that the pump 29 draws oil from the bottom of the crank case and forces it under pressure through the piping in the conduits to the conduit 23 of the crank shaft and from the crank shaft to the various bearings. The motor cylinders are lubricated by means of the oil which escapes from the bearings on the crank shaft upon which the connecting rods are supported and it will be evident, therefore, that a greater amount of lubricant will escape from these bearings when the lubricant is circulating under maximum pressure than when under a decreased pressure. It will also be evident that, inasmuch as the oil pump is connected to the motor and is driven thereby, a greater amount of oil will be supplied at high speed than at low speed and, therefore, that the pressure will be increased.

The oil pressure relief valve which will now be described is designed to maintain under normal conditions a maximum pressure of oil in order to properly lubricate the parts of the motor when the motor is running under a heavy load and is also designed to automatically decrease the oil pressure when the motor is idling and the throttle is nearly closed.

In the present instance this valve is mounted upon one of the bearings 20 of the crank shaft, but it should be understood that this is entirely optional and that the valve may be inserted at any other suitable place in the circulation system and will operate in the same manner in such other positions.

The relief valve is indicated at 30 and comprises a barrel shaped member having a port 31 at the lower end thereof, this port being located over an oil conduit 32 formed in one of the end bearings of the crank shaft. A valve 33 seats on the port 31, being retained in this position by means of a spring 34 which is connected as shown at 35 to a grooved lug 36 formed on the valve 33. The barrel 30 is provided adjacent its lower end and above the port 31 with a plurality of radial openings 37, these openings conducting the oil which passes through the port 31 back into the crank case through openings 27 in the crank case web. At its upper end the spring 34 is seated against an adjustable abutment 38 which is I-shaped, having a lower guiding portion 39 and an upper guiding portion 40. A shoulder 41 is formed on the inner wall of the barrel shaped member 30 and the portion 39 of the adjustable abutment normally seats against this shoulder. The spring 34 is positively connected to the lower end of the member 38, being seated in a groove 42 similar to the groove 35 above described.

The upper portion 40 of the member 38 is provided with a packing member 44, formed preferably of leather, this member forming an air tight joint between the portion 40 and the inner wall of the barrel 30. The member 38 is normally retained in the position shown in Figure 2 by means of a spring 45 which is guided by any suitable means such as a screw 46 to the upper surface of the portion 40 of the member 38 and engages at its upper end an adjustable stop 47 which is shown as having a screw threaded engagement with a cap 48, this latter member also being screw threaded on the upper open end of the barrel 30 as shown at 49.

Suitable packing material 50 is provided at the joints of the various members just described in order to form an air tight compartment. A cap 51 is also secured to the member 48 and encloses the adjustable stop 47 and further seals the barrel 30. The portion of the barrel 30 disposed above the abutment 38 and indicated at 51' is connected by means of a suitable conduit 52 to the intake manifold of the motor and through this conduit the depression in the intake manifold is communicated to the chamber 51', with the results hereinafter described.

When the oil is circulating in the lubricating system under maximum pressure, the excess oil forces the valve 33 from its seat against the tension of the spring 34 and escapes through the radial apertures 37 back into the crank case. This condition applies when the motor is running under a heavy load, but when the throttle is nearly closed a depression is created in the intake manifold and in the cylinders and this depression is communicated through the conduit 52 to the chamber 51' above the adjustable abutment 38. Since this chamber is substantially air tight, this depression draws the adjustable abutment 38 upwardly against the tension of the spring 45, thereby decreasing the tension on the spring 34 and allowing the valve 33 to rise from its seat over port 31 and permitting a greater amount of oil to escape through the apertures 37. Since the spring 34 is positively connected to the valve 33 and to the grooved end of the abutment, it will be evident that the valve will be lifted by means of the spring from its seat when the abutment 38 has been raised sufficiently by means of the depression in the chamber 51'. The tension on the spring 45 can be properly adjusted to seat the abutment 38 in the position shown in Figure 2 under normal conditions by means of the adjustable stop 47. A vent 53, which is open to the crank case and to the atmospheric pressure, is provided in the wall of the barrel 30 below the upper portion 40 of the adjustable abutment 38 in order to permit the abutment to rise under the influence of the depression communicated from the intake manifold.

This vent also permits the escape of any oil that leaks past the part 39 and prevents the suction or depression above part 40 from being communicated to the part of the valve unit below part 39 in case the part 40 and packing 44 do not effectively seal the chamber 51'.

It will be seen that the valve above described is entirely automatic in its action and that the improved valve unit performs a dual function, namely, to maintain a normal maximum pressure in the lubricating system and to automatically relieve this pressure when the motor is idling or operating under a light load.

While one specific embodiment of the invention has been illustrated and described, it should be understood that changes and modifications may be made in the construction and arrangement, and relative locations of the respective parts without departing from the spirit or scope of the invention as expressed in the following claims.

What I claim and desire to secure by Letters Patent is:

1. A valve unit for circulating systems comprising a chamber having an inlet port and an outlet port, a valve seated upon and controlling said inlet port, resilient means within said chamber for yieldingly maintaining said valve in closed position, said resilient means being positively connected at one end with said valve, and an adjustable abutment mounted in said chamber and positively connected with the other end of said resilient means.

2. A valve unit for oil circulating systems comprising a chamber having an inlet port and an outlet port, a valve seated upon and controlling said inlet port, an adjustable abutment in said chamber, means for limiting the movement of said abutment in one direction, and a spring positively connected to said abutment and to said valve for positioning said valve with respect to said inlet port.

In testimony whereof I affix my signature.

GORDON B. SAYRE.